(12) United States Patent
Roeland et al.

(10) Patent No.: US 10,257,775 B2
(45) Date of Patent: Apr. 9, 2019

(54) ATTACHMENT OF A MOBILE TERMINAL TO A RADIO ACCESS NETWORK

(71) Applicant: TELEFONAKTIEBOLAGET L M ERICSSON (PUBL), Stockholm (SE)

(72) Inventors: Dinand Roeland, Sollentuna (SE); Kaiyuan Huang, Kanata (CA); Stephen Rayment, Ottawa (CA)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 125 days.

(21) Appl. No.: 14/914,090

(22) PCT Filed: Aug. 28, 2013

(86) PCT No.: PCT/EP2013/067801
§ 371 (c)(1),
(2) Date: Feb. 24, 2016

(87) PCT Pub. No.: WO2015/028053
PCT Pub. Date: Mar. 5, 2015

(65) Prior Publication Data
US 2016/0212691 A1 Jul. 21, 2016

(51) Int. Cl.
*H04W 48/18* (2009.01)
*H04W 48/16* (2009.01)
(Continued)

(52) U.S. Cl.
CPC .......... *H04W 48/16* (2013.01); *H04W 24/08* (2013.01); *H04W 48/18* (2013.01); *H04W 48/20* (2013.01);
(Continued)

(58) Field of Classification Search
CPC ..... H04W 48/16; H04W 60/00; H04W 24/08; H04W 48/18; H04W 48/20; H04W 24/10; H04W 88/06; H04W 84/12
See application file for complete search history.

(56) References Cited

U.S. PATENT DOCUMENTS

| | | | | |
|---|---|---|---|---|
| 5,390,339 A | * | 2/1995 | Bruckert | G01S 5/02 342/457 |
| 7,760,702 B2 | * | 7/2010 | Deng | H04B 7/15592 370/351 |

(Continued)

FOREIGN PATENT DOCUMENTS

| WO | 9722215 A1 | 6/1997 |
|---|---|---|
| WO | 2014148969 A1 | 9/2014 |

(Continued)

OTHER PUBLICATIONS

Rayment, et al., Achieving carrier-grade Wi-Fi in the 3GPP world, Ericsson Review, Dec. 5, 2012.

(Continued)

*Primary Examiner* — Phuc H Tran

(57) ABSTRACT

A method and apparatus for determining whether to allow attachment of a mobile terminal to a Radio Access Network. A selection function node receives an indication that the mobile terminal has requested to attach to the Radio Access Network. A determination is made of a property of a radio connection on both an uplink and a downlink between the mobile terminal and the RAN. On the basis of the determined property, a further determination is made as to whether to allow attachment of the mobile terminal to the RAN.

3 Claims, 8 Drawing Sheets

(51) Int. Cl.
  *H04W 48/20* (2009.01)
  *H04W 24/08* (2009.01)
  *H04W 60/00* (2009.01)
  H04W 24/10 (2009.01)
  H04W 84/12 (2009.01)
  H04W 88/06 (2009.01)

(52) U.S. Cl.
  CPC ............ *H04W 60/00* (2013.01); *H04W 24/10* (2013.01); *H04W 84/12* (2013.01); *H04W 88/06* (2013.01)

(56) References Cited

U.S. PATENT DOCUMENTS

| | | | | |
|---|---|---|---|---|
| 2005/0213579 | A1* | 9/2005 | Iyer | H04L 63/1441 370/395.2 |
| 2006/0135066 | A1* | 6/2006 | Banerjea | H04W 48/20 455/41.2 |
| 2006/0281462 | A1* | 12/2006 | Kim | H04W 36/30 455/436 |
| 2008/0101291 | A1* | 5/2008 | Jiang | H04L 63/08 370/331 |
| 2009/0232089 | A1* | 9/2009 | Lott | H04W 36/0055 370/331 |
| 2010/0064135 | A1* | 3/2010 | Thakare | H04W 12/06 713/156 |
| 2011/0053585 | A1* | 3/2011 | Otonari | H04W 72/085 455/422.1 |
| 2011/0250925 | A1* | 10/2011 | Han | H04W 36/0055 455/524 |
| 2011/0283344 | A1* | 11/2011 | Krishnan | H04L 63/08 726/5 |
| 2012/0213148 | A1* | 8/2012 | Saito | H04B 7/15542 370/315 |
| 2012/0314606 | A1* | 12/2012 | Takano | H04W 36/0072 370/252 |
| 2013/0208615 | A1* | 8/2013 | Ishikura | H04L 5/001 370/252 |
| 2014/0086225 | A1* | 3/2014 | Jung | H04W 76/10 370/338 |
| 2015/0237499 | A1* | 8/2015 | Tg | H04W 12/06 726/4 |
| 2016/0198502 | A1* | 7/2016 | Jung | H04W 76/10 370/338 |
| 2017/0079011 | A1* | 3/2017 | Kenney | H04L 1/00 |

FOREIGN PATENT DOCUMENTS

WO  2014148970 A1  9/2014
WO  2014168549 A1  10/2014

OTHER PUBLICATIONS

Draft 3GPP TR 23.852 V1.3.0, 3rd Generation Partnership Project; Technical Specification Group Services and System Aspects; Study on S2a Mobility based on GTP & WLAN access to EPC (SaMOG); Stage 2 (Release 12), Nov. 2012.

3GPP TS 23.401 V11.4.0, 3rd Generation Partnership Project; Technical Specification Group Services and System Aspects; General Packet Radio Service (GPRS) enhancements for Evolved Universal Terrestrial Radio Access Network (E-UTRAN) access (Release 11), Dec. 2012.

3GPP TR 23.865 V0.4.0, 3rd Generation Partnership Project; Technical Specification Group Services and System Aspects; WLAN Network Selection for 3GPP Terminals; Stage 2 (Release 12), Nov. 2012.

Wi-Fi Alliance HotSpot 2.0, http://www.wi-fi.org/discover-wi-fi/wi-fi-certified-passpoint.

Holopainen, et al., End to End Principle in Access Point Selection, World of Wireless, Mobile and Multimedia Networks, 2007.

3GPP TS 23.402 V12.1.0, 3rd Generation Partnership Project; Technical Specification Group Services and System Aspects; Architecture Enhancements for Non-3GPP Accesses (Release 12), Jun. 2013, 254 pages.

* cited by examiner

ATTACHMENT OF A MOBILE TERMINAL TO A RADIO ACCESS NETWORK

This application is a 371 of International Application No. PCT/EP2013/067801, filed Aug. 28, 2013, the disclosure of which is fully incorporated herein by reference.

TECHNICAL FIELD

The present disclosure relates to the field of attachment of a mobile terminal to a Radio Access Network.

BACKGROUND

The Third Generation Project Partnership (3GPP) has developed the System Architecture Evolution (SAE) as the core network architecture of its future and Long Term Evolution (LTE) wireless mobile telecommunications standard. The main component of the SAE architecture is the Evolved Packet Core (EPC; see "Architecture enhancements for non-3GPP Accesses," 3GPP TS 23.402). The LTE/SAE network includes network entities supporting the user and control planes.

An ongoing trend within telecommunications is the convergence of fixed and mobile networks, which is known as Fixed Mobile Convergence (FMC). The trend of evolving networks using IP-based technologies is common for fixed and mobile networks, which makes the convergence easier. By FMC, mobile and fixed network operators will be able to utilize their network resource more efficiently, which leads to reduction of capital and operational expenditure (CAPEX and OPEX). For instance, when a user is running an IP-based application such as Multimedia Telephony (MMTel) inside their home, it is more efficient to utilize broadband connectivity of the fixed access network rather than the wireless access network.

Residential networks have been important to the success of FMC because they are the most commonly used fixed network access by ordinary users. Therefore, it is important to be able to connect mobile phones to the EPC through a residential network. The term User Equipment (UE) can be used in place of the term mobile terminal or mobile phone. The term UE is familiar in the 3GPP documentation, and is intended to refer to any piece of equipment that is configured to access the internet; it would include, for example and without limitation, mobile telecommunication devices, portable or handheld computing devices and desktop or installed computers.

3GPP defines mobile 2G/3G/LTE accesses and "non-3GPP accesses" (TS 23.402). The latter can be a fixed network. The BBF (BroadBand Forum, the standardization organization for the fixed access; see http://www.broadband-forum.org/) defines an architecture for fixed networks. Many UEs address the FMC trend by providing multiple radio interfaces: one interface to connect to a 2G/3G/LTE access and a WiFi interface to connect to a fixed network via a Wireless Local Area Network (WLAN). FIG. 1 shows a simplified network architecture in which a UE 1 attaches to an Access Point (AP) 2 in a Radio Access Network (RAN) 3. In this example, the RAN 3 is a WLAN. The UE 1 can then access services from a service network 4 via a Core Network 5.

Some of the key drivers for the integration of WLAN with 3GPP are:
a) The large growth in mobile broadband traffic. To accommodate this, unlicensed WLAN spectrum can serve as a complement to the 3GPP Radio Access Technology (RAT) spectrum;
b) The wide support of WLAN connectivity in devices. Most modern mobile devices include both 3GPP radio and WLAN radio; and
c) The desire from operators to support the same services regardless access.

SaMOG ("Study on S2a Mobility based on GTP & WLAN access to EPC") is, at the time of writing, a 3GPP work item. The aim of SaMOG is to allow a UE (User Equipment, in most cases a mobile device) to gain access to the 3GPP Evolved Packet Core (EPC) using WLAN as access technology. Currently, 3GPP Rel-11 does not support handover with IP address preservation between 3GPP and WLAN. Furthermore, a UE is restricted to having only a single Packet Data Network (PDN) connection or a single IP offload connection via WLAN. A PDN connection can be seen as a logical IP tunnel between the UE and the EPC network. An operator may also decide to offload the EPC. In this case, an IP offload connection is setup. The UE's traffic is then not routed via EPC, but directly offloaded to the Internet from the WLAN access network SaMOG working items include the proposal to support IP address preservation upon a handover between 3GPP and WLAN. A "multi-PDN scenario", includes not only support for handover with IP address preservation, but also support for multiple PDN connections via WLAN, and support for having one or more PDN connection via WLAN simultaneous with one or more IP offload connections via WLAN.

FIG. 2 shows a UE 1, an Access Point (AP) 2, an evolved NodeB (eNB) 6, a Trusted Non-3GPP Access Network Gateway (TWAG) 7, a Serving Gateway (SGW) 8, a PDN Gateway (PGW) 9 and an Authentication, Authorization, and Accounting (AAA) Server 10. These nodes and functions are described in more detail in 3GPP TS 23.402.

In step S1, the UE 1 associates with the AP 2. An authentication process S2 takes place. The TWAG 7 then sends a create session request S3 to the PGW 9, which responds S4. Step S5 provides an IP address to the UE 1, and step S10 indicates that the PDN connection between the UE 1 and the PGW 9 is established.

Note that FIG. 2 illustrates a General Packet Radio Service Tunneling Protocol (GTP) option. A similar process may be used in a Proxy Mobile IP (PMIP) network.

FIG. 3 is a signalling diagram in a multi-PDN scenario, and is a simplified version of a signalling diagram from SaMOG. In this example the first connection is an offload IP connection. Attachment parameters for the first connection are sent as part of authentication in step S12. A second connection, a PDN connection in this example, is setup in steps S16 to S22

SaMOG defines how a UE 1 attaches to the network and in particular how a PDN connection is setup via WLAN. It does not specify which AP 2 the UE 1 attaches to. Neither does it specify under which conditions the UE 1 can attach to a specific AP 2. On a high level, there are two ways to control a UE when to attach, and to which AP:
1. The first method is based on policies in the UE 1. These policies may be pre-configured in the UE 1, or may be downloaded from a network node. In a 3GPP architecture, such a network node is called Access Network Discovery and Selection Function (ANDSF). A policy rule may, for example, say "Attach to SSIDx when it is available". This may be further refined to include performance measurements, for example "Attach to SSIDx only when the load of the AP is below a certain threshold".
2. The second method allows the network to decide when and where the UE 1 attaches. It then instructs the UE 1 to do so by an explicit command. This way, policies are kept inside the network. The network policy function may make an attachment decision based on measurements performed by the UE 1. For example, the UE 1 may be attached to a Long Term Evolution (LTE) network. The network then instructs the UE 1 to take measurements on connections with various WLAN APs. After receiving the measurement results, the policy function decides which AP 2 the UE 1 shall attach to. Finally, the policy function explicitly instructs the UE 2 to attach.

SUMMARY

It has been realised that existing methods of selecting a WLAN (or other type of RAN) to attach to only allow a UE to measure properties of a broadcast signal from an access node such as an Access Point. This is not an accurate predictor of performance of real data traffic using a connection between the UE and the access node. The measurements cannot reflect any measure of the uplink from the UE to the access node, and the properties of an uplink from the UE to the access node can be very different from the properties of a broadcast signal from the access node. Properties can vary greatly depending on, for example, the transmission power of a particular UE or the signal to noise ratio (SNR). In a WLAN network, the SNR can be particularly problematic when an uplink channel is shared by more than one UE.

According to a first aspect, there is provided a method of determining whether to allow attachment of a mobile terminal to a Radio Access Network (RAN). A selection function node receives an indication that the mobile terminal has requested to attach to the RAN. A determination is made of a property of a radio connection on both an uplink and a downlink between the mobile terminal and the RAN. On the basis of the determined property, a further determination is made as to whether to allow attachment of the mobile terminal to the RAN.

An advantage of this is that properties on both the uplink and the downlink are measured. This accounts for asymmetric properties of the uplink and the downlink. For example, in cases where properties of the uplink from the mobile terminal to the RAN are poor, the mobile terminal might still be allowed to attach to the RAN using known procedures. However, the procedure described above means that the mobile terminal might not be allowed to attach to the RAN if the properties of the uplink are poor. This ensures that attachment is not allowed in circumstances that would provide a poor connection between the mobile terminal and the RAN.

An optional example of a RAN is a Wireless Local Area Network (WLAN), although the same procedures may apply to other types of RAN. Where the RAN is a WLAN, the property is a property measured between the mobile terminal and an Access Point (AP) located in the WLAN. Optional examples of a determined property are delay, Round Trip Time, packet loss, signal strength, Received Signal Strength Indicator and Signal to Noise Ratio.

As an option, the property is determined by measuring a property of packets sent from a node in the RAN to the mobile terminal and returned from the mobile terminal to the node in the RAN.

The selection function node is optionally located in a core network, although it could alternatively be located in the access network.

As a further option, and prior to determining the property of a radio connection between the mobile terminal and the RAN, the selection function determines that the property should be determined. In some circumstances it may not be possible or necessary to determine the property, and so the decision to allow access is taken without determination of the property.

According to a second aspect, there is provided a system for determining whether to allow attachment of a mobile terminal to a RAN. The system comprises an access node in the RAN, the access node arranged to receive from the mobile terminal a request to attach to the RAN. The access node is further arranged to determine a property of a radio connection on both an uplink and a downlink between the mobile terminal and the access node. The system further is also provided with a selection function node arranged to, on the basis of the determined property, determine whether to allow attachment of the mobile terminal to the RAN.

According to a third aspect, there is provided a selection function node for use in a communication network. The selection function node is provided with a receiver for receiving an indication that a mobile terminal has requested to attach to a RAN. A processor is arranged to determine a property of a radio connection on both an uplink and a downlink between the mobile terminal and the RAN, and to consequently determine whether to allow attachment of the mobile terminal to the RAN. A transmitter is provided for indicating to a node in the RAN whether the mobile terminal may attach to the RAN.

The RAN is optionally a WLAN, in which case the node in the RAN is an AP.

Optional examples of the property are any of delay, Round Trip Time, packet loss, signal strength, Received Signal Strength Indicator and Signal to Noise Ratio.

As an option, the selection function node is located in a core network.

As a further option, the processor is arranged to, prior to determining a property of a radio connection between the mobile terminal and the RAN, determine that the property should be determined.

According to a fourth aspect, there is provided an access node for use in a RAN. The access node is provided with a first receiver for receiving from a mobile terminal a request to attach to the RAN. A transmitter is provided for sending a packet to the mobile terminal. The first receiver is arranged to receive a response packet sent from the mobile terminal. A processor is provided for determining, on the basis of properties of the sent packet and the response packet, a property of a radio connection between the mobile terminal and the access node. A second transmitter is provided for sending an indication of the property to a selection function node. A second receiver is provided for receiving from the selection function node a message indicating whether to allow attachment of the mobile terminal to the RAN. This allows attachment of the mobile terminal on the basis not just of a broadcast from the RAN to the mobile terminal, but also on the basis of the properties of an uplink from the mobile terminal to the RAN, which may have very different properties to the broadcast signal from the access node.

According to a fifth aspect, there is provided a mobile terminal for use in a communication network. The mobile terminal is provided with a transmitter for sending to an access node in a RAN a request to attach to the RAN. A receiver is provided for receiving a packet from the access node. The transmitter is further arranged to send to the access node a response packet. The received packet and the response packet are usable by a further node to determine a property of a radio connection between the mobile terminal and the access node. The receiver is further arranged to receive from the access node an indication that the mobile terminal may attach to the RAN.

According to a sixth aspect, there is provided a computer program comprising computer readable code which, when run on a selection function node causes the selection function node to perform the method as described above in the first aspect.

According to a seventh aspect, there is provided a computer program comprising computer readable code which, when run on an access node, causes the access node to behave as an access described above in the fourth aspect.

According to an eighth aspect, there is provided a computer program comprising computer readable code which, when run on a mobile terminal, causes the mobile terminal to behave as a mobile terminal as described above in the fifth aspect.

According to a ninth aspect, there is provided a computer program product comprising a non-transitory computer readable medium and a computer program (according to any as described in any of the sixth, seventh or eighth aspects, wherein the computer program is stored on the non-transitory computer readable medium.

According to a tenth aspect, there is provided a vessel or vehicle comprising any of a selection function node as described in the third aspect, an access node as described in the fourth aspect, and a mobile terminal as described in the fifth aspect.

DETAILED DESCRIPTION

Techniques are available for a mobile terminal such as a UE to discover and select an access node in a RAN 3, such as an Access Point (AP) 2 in a WLAN. For example, the UE 1 can determine the strength of radio signals coming from different APs and attach to the AP with the strongest signal. However, as mentioned above, this selection is made on the basis of a broadcast signal from each AP. It may be that, once a UE 1 has attached to an AP 2, the AP 2 is not particularly suitable. It may be experiencing congestion; it may already be serving a large number of other UEs which can lead to congestion on shared channels. Furthermore, the broadcast signal from each AP may have very different properties, such as Received Signal Strength Indicator (RSSI) or SNR, compared to an uplink connection from the UE 1 to the AP 2.

It is proposed to introduce a further step after the UE has initially attempted to attach to an AP 2. This is termed herein a "validation phase". The purpose of the validation phase is to determine whether the initial decision of the UE 1 to attach to the AP 2 is a good decision, and that the connection is adequate to send "real" data (rather than just looking at the strength of a broadcast signal). Validation verifies the performance of signalling on both the downlink and the uplink, which typically have asymmetric properties.

The following description uses the specific example of a UE 1 selecting a WLAN AP 2 to attach to. However, it will be appreciated that the same techniques may be applied to any type of Radio Access Technology (RAT) in which a mobile terminal can select an access node from a plurality of other access nodes (for example an LTE network). However, the problem addressed by the methods and apparatus described below is particularly relevant to WLAN access networks because there is no dedicated channel between a UE 1 and an AP 2; channels are typically shared between UEs, and so congestion can become a problem.

After the initial request for the UE 1 to attach to the AP 2, the validation stage involves obtaining accurate performance measurements on the target access. In an embodiment, measurement reports are received by a policy function in the network, termed herein a selection function. The selection function applies policies and rules to the measurements and decides whether the UE 1 should attach to the AP 2. A decision is then sent to the AP 2 and onto the UE 1. The decision may indicate approval to finalize the attachment, a rejection of the attempted attachment, or a timeout value to the UE 1 which must elapse before the UE 1 can make a subsequent attempt to attach to the AP 2. The selection function may be located in a core network or a node in the access network such as a TWAG.

Figure 1:
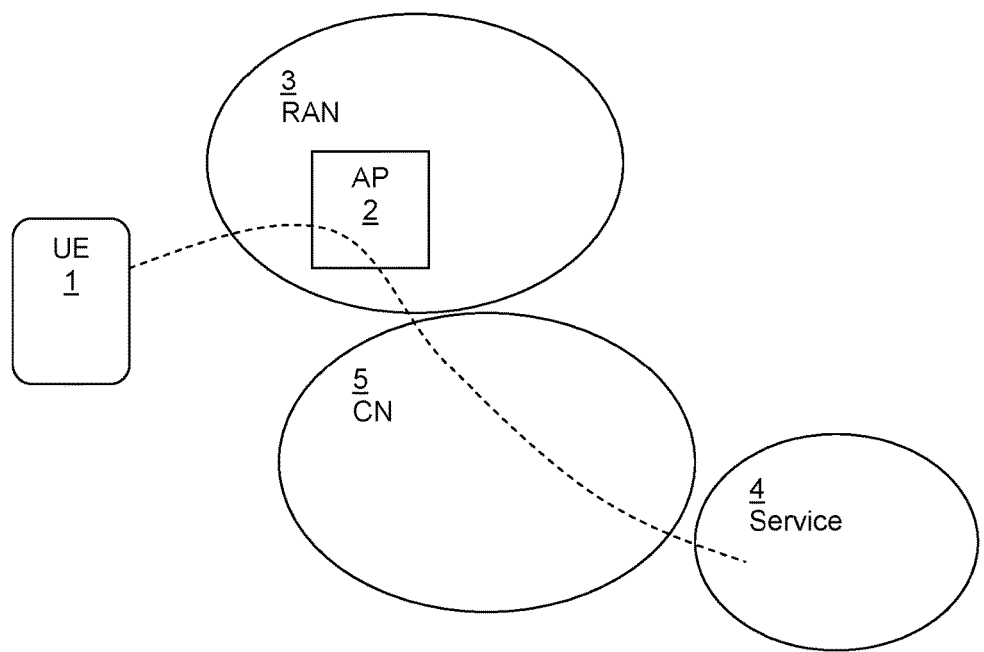
FIG. 1 illustrates schematically in a block diagram a communication network including a WLAN access network.
Figure 2:
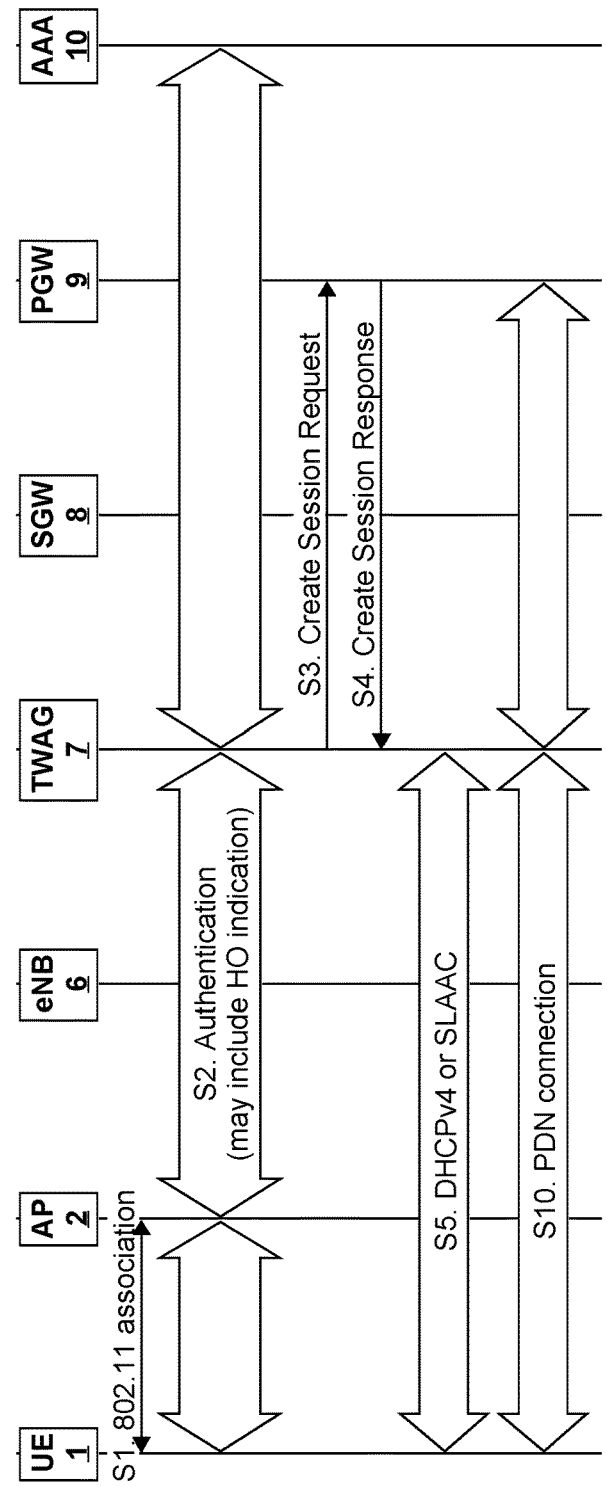
FIG. 2 is a signalling diagram showing a known procedure for a UE attaching to a WLAN in a single-PDN scenario.
Figure 3:
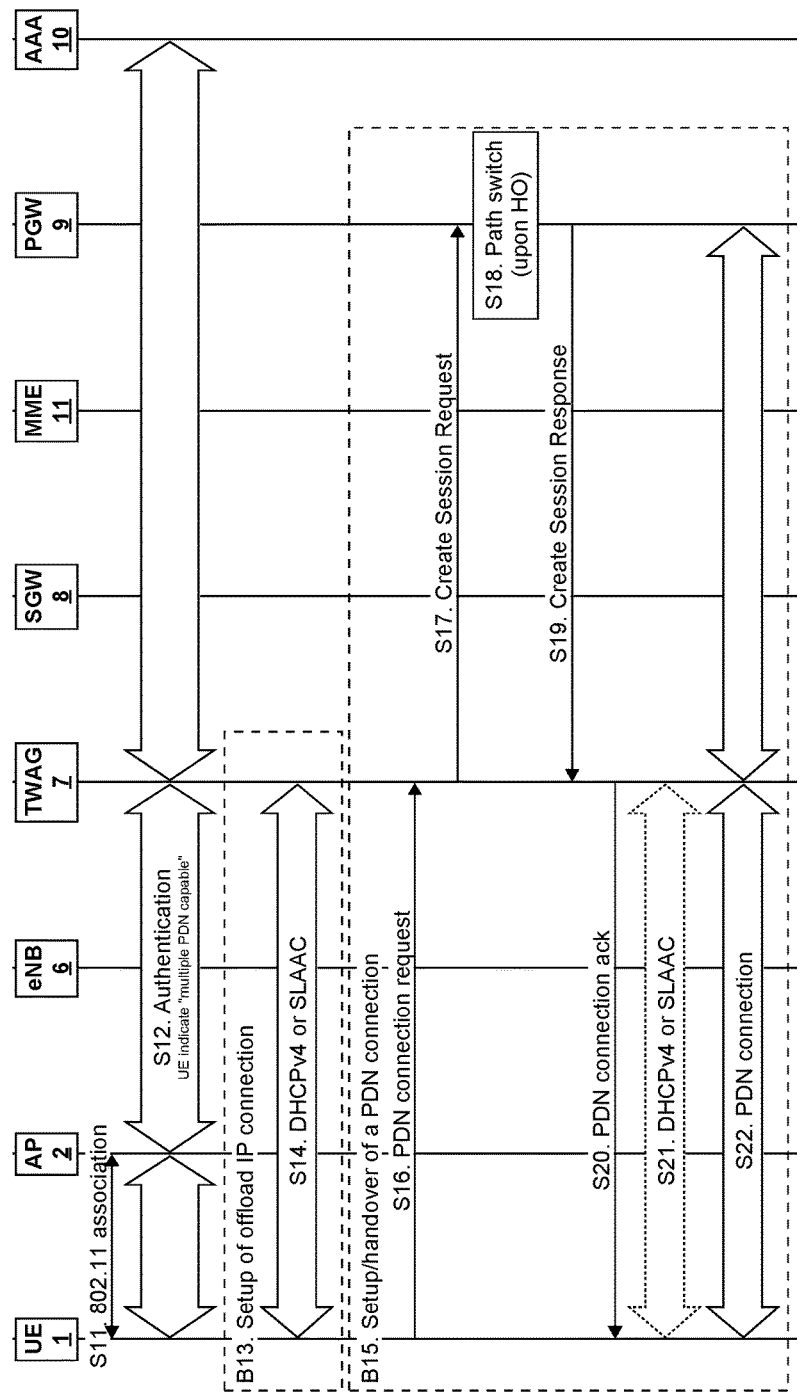
FIG. 3 is a signalling diagram showing a known procedure for a UE attaching to a WLAN in a multi-PDN scenario.
Figure 4:
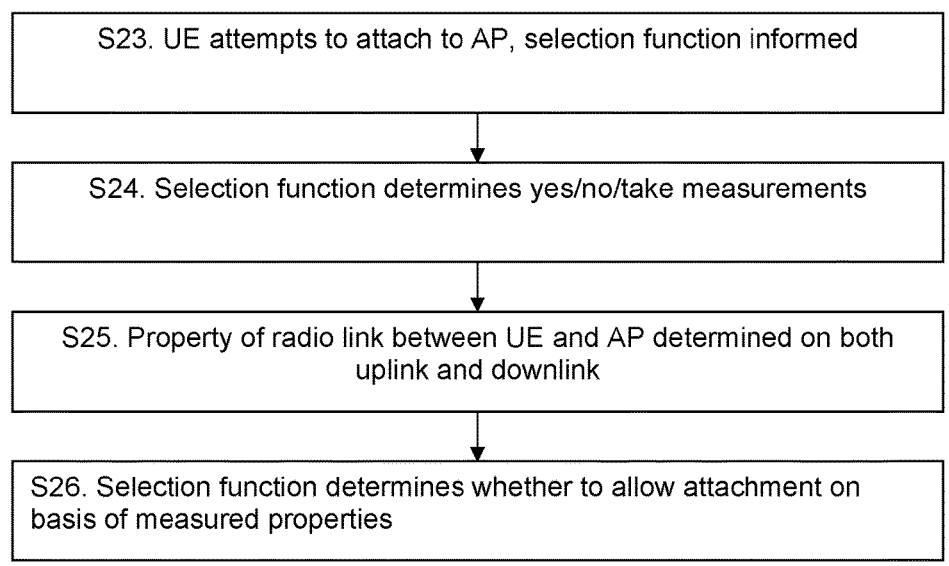
FIG. 4 is a flow diagram illustrating exemplary steps.

FIG. 4 shows high level exemplary steps, with the following numbering corresponding to that of FIG. 4:

S23. A selection function node receives an indication in a message informing it that the UE 1 is attempting to attach to the AP 2.

S24. The selection function node may choose to reply with one of three responses:
(i) the UE 1 may attach to the AP 1;
(ii) the UE 1 may not attach to the AP 1; or
(iii) the AP 2 is instructed to take measurements of the signal between the UE 1 and the AP 2 before a decision is made. The following steps assume that this is the decision.

S25. A property of a radio connection between the UE 1 and the AP 2 is measured. This may include measurements of real data sent between the UE 1 and the AP 2 on the uplink, the downlink, or a combination of both. Examples of properties measured signal to noise ratio (SNR), Round Trip Time (RTT), delay, signal strength, packet loss or any other properties that could affect the sending of data between the UE 1 and the AP 2. The property may be measured, for example, by sending packets from the AP 2 to the UE 1. The UE 1 replies with response packets, and the property is measured.

S26. On the basis of the measured property or properties, the selection function node determines whether to allow the UE 1 to attach to the AP 2, and communicates this decision to the AP 2.

Figure 5:
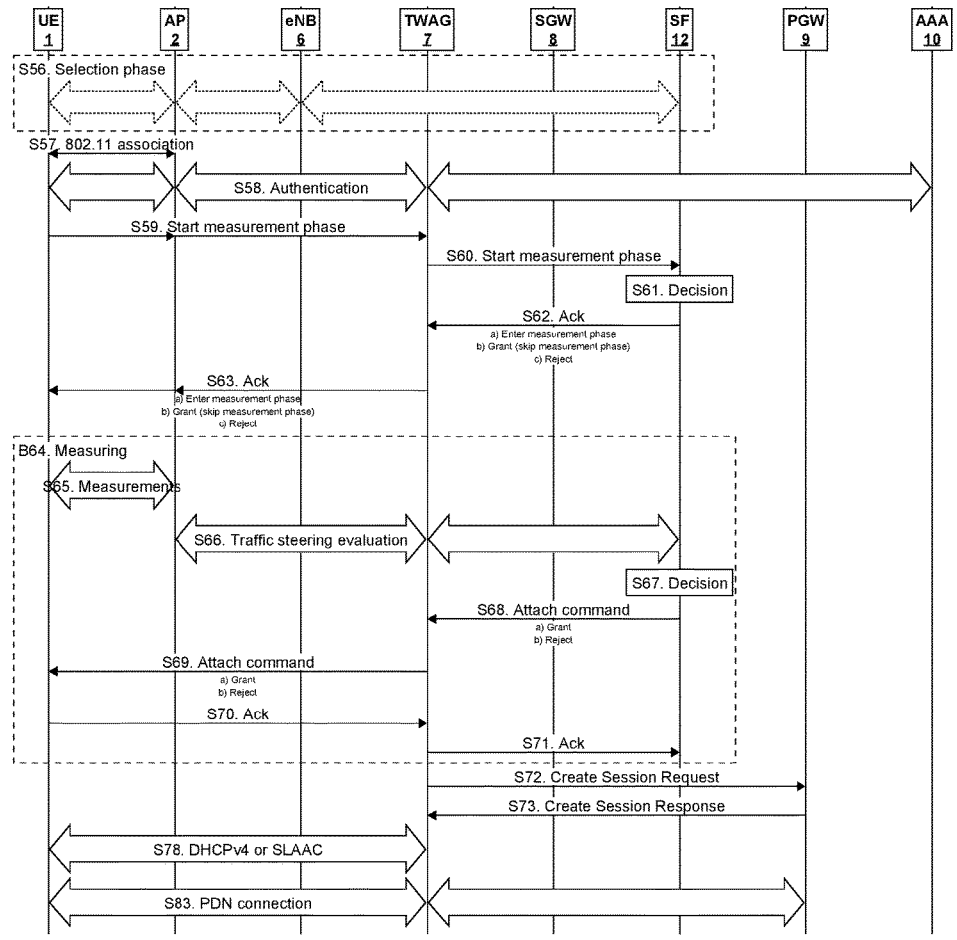
FIG. 5 is a signalling diagram showing an alternative exemplary procedure for a UE attaching to a WLAN in a single-PDN scenario.

FIG. 5 shows exemplary signalling in a single PDN scenario. In steps S56 to S58 the UE 1 selects the AP 2, attempts to attach to it, and is authenticated. In step S59, the UE requests that a measurement phase is started (note that this is an optional step, and that all steps S59 to S71 are optional, depending on the capabilities of the UE 1 and the network, and the requirements of the network operator). This is sent to a selection function node 12, which decides S61 whether to allow attachment without taking measurements, refuse attachment, or take measurements. The fact that the UE 1 has requested measurements informs the selection function 12 that the UE 1 is capable of participating in a validation phase.

In step S65, measurements are taken between the UE 1 and the AP 2. The UE 1 may perform measurements autonomously or upon request from the network. A measurement may take form of one or more echo-and-reply exchanges between UE 1 and AP 2 sent from the UE 1. Alternatively, the echo/reply may be initiated by the AP 2.

As described above, these may be any suitable measurements, such as SNR, RTT, delay, signal strength, packet loss and so on. Measurements are communicated to the selection function 12. On the basis of the measurements and rules or policies, the selection function 12 makes a decision S67 on whether to allow attachment. This decision is communicated to the UE 1. Assuming that attachment is permitted, a tunnel is set up between the TWAG 7 and the PGW 10 and by that a PDN connection is established between the UE 1 and the PGW 9.

Note that all of the steps in block B64 are dependent on the UE 1 having the capability to participate in the validation phase.

If attachment is rejected, the UE 1 leaves the AP 2. These steps are not shown in FIG. 5. The rejection signal from the selection function 12 may include a timer value indicating a time period which must elapse before the UE 1 can make a subsequent attachment attempt towards the AP 2.

After step S58, depending on the capabilities of the network and the UE 1, the validation phase (blocks S59 to S71) may or may not be executed. Capabilities may be exchanged in several ways. One example is to send an explicit capability exchange as part of authentication S59. This allows the TWAG 7 to postpone the tunnel setup (steps S68-S69) until the attachment of the UE 1 to the AP 2 has been granted. In this way, PGW 9 resources can be reserved and are not unnecessarily used in the event that the UE 1 is not permitted to attach to the AP 2.

The validation phase, in which the measurements are taken and a decision on whether to allow access is taken, occurs after authentication but before the IP session set-up. In this example, the UE 1 requests that measurements are taken (step S59). Note, however, that if a UE 1 (for example, a legacy UE 1) is not capable of participating in the validation phase, no validation phase will occur.

Figure 6:
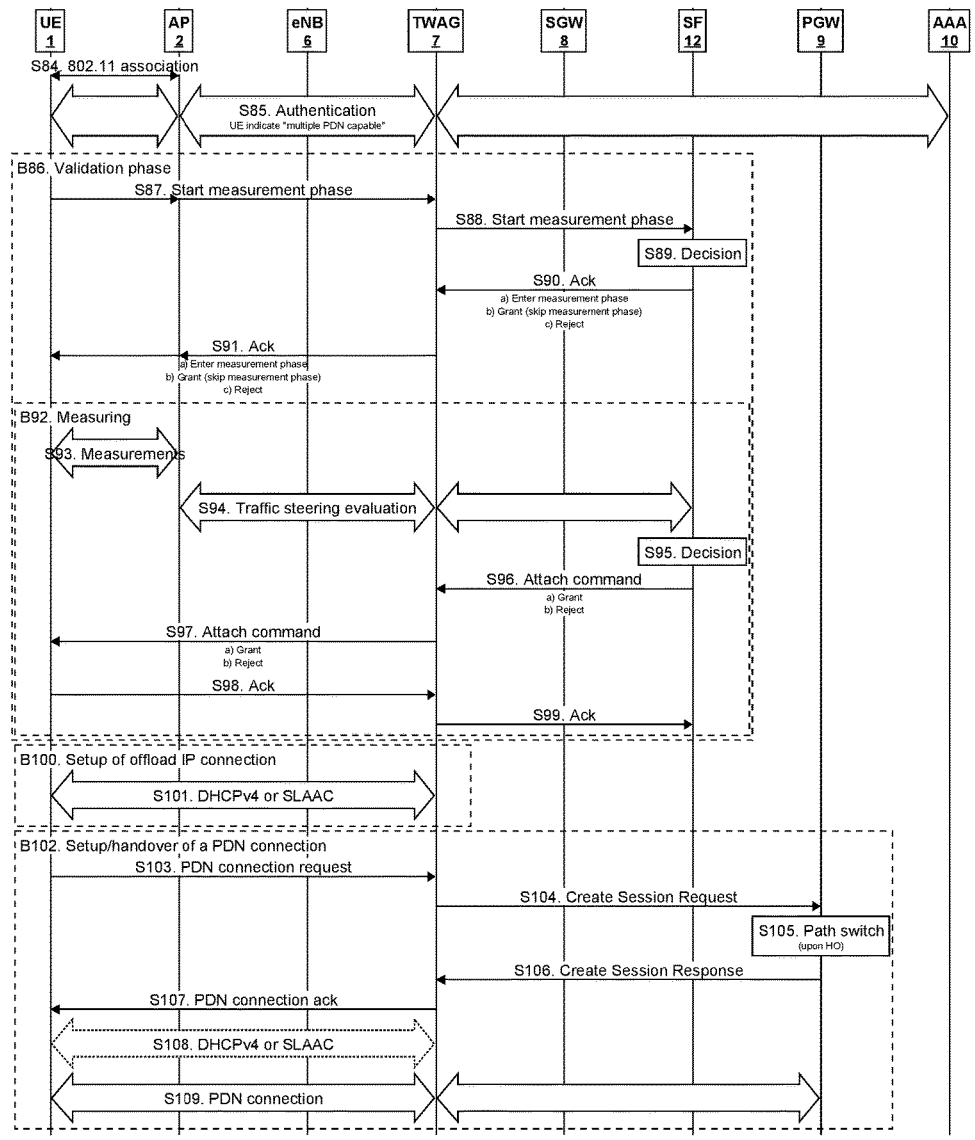
FIG. 6 is a signalling diagram showing an exemplary procedure for a UE attaching to a WLAN in a multi-PDN scenario.

FIG. 6 shows exemplary signalling for the validation phase (block B86) in a multi-PDN scenario. The first connection set up is an IP offload connection (block B100).

In the case of a multi-PDN scenario where a request to setup a first PDN connection is carried using authentication signalling, a procedure similar to that illustrated in FIG. 5 can be used. In this case, further PDN connections are established using procedures shown in blocks B100 or B102 as shown in FIG. 6. The procedures of blocks B100 or B102 are performed after the steps illustrated in FIG. 5.

Figure 7:
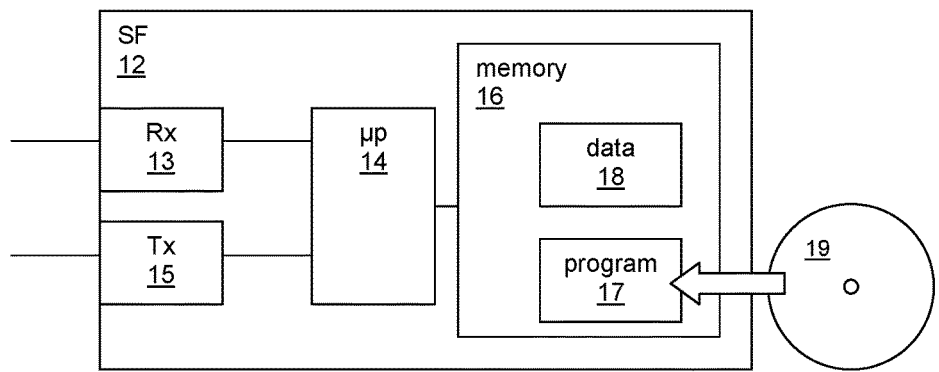
FIG. 7 illustrates schematically in a block diagram an exemplary selection function node.

FIG. 7 shows an exemplary selection function 12. The selection function 12 is provided with a receiver for receiving an indication that a UE 1 has requested to attach to an AP 2. Note that an AP 2 is described by way of example only, and the UE 1 may be attempting to attach to an access node in any type of RAN 3. A processor 14 is provided that is arranged to determine a property of a radio connection on both an uplink and a downlink between the UE 1 and the RAN 3. The processor 14 is further arranged to determine whether to allow attachment of the UE 1 to the RAN 3 on the basis of the determined properties. In other words, once the UE 1 has selected a RAN 3 and requested attachment to the AP 2, a validation phase is carried out to determine properties of both the uplink and the downlink between the UE 1 and the AP 2. The decision to allow attachment is therefore not only based on the broadcast signal from the AP but also 'real' signalling in both directions between the AP 2 and the UE 1. A transmitter 15 is provided for indicating to the AP 2 in the RAN 3 whether the UE 1 may attach to the RAN 3.

As described above, examples of properties determined are delay, RTT, SNR, RSSI and so on.

The selection function node may be located at any suitable location. For example, it may be part of the TWAG 7 in the access network, or it may be located at a suitable node in the core network The selection function 12 is also provided with a computer readable medium in the form of a memory 16. The memory 16 may be used to store a program 17 which, when executed by the processor 14, causes the selection function 12 to behave as described above. The memory 16 may also be used to store data 18 usable by the processor to determine whether or not to allow the UE 1 to access the RAN 3. The data 18 may include rules and thresholds of acceptable values applied by the processor to the determined properties.

Note that the computer program 17 may be stored on an external computer readable medium in the form of a second memory 19, such as a Compact Disk or a flash drive. The computer program 17 can then be transferred to the memory 16 or executed directly by the processor 14.

Figure 8:
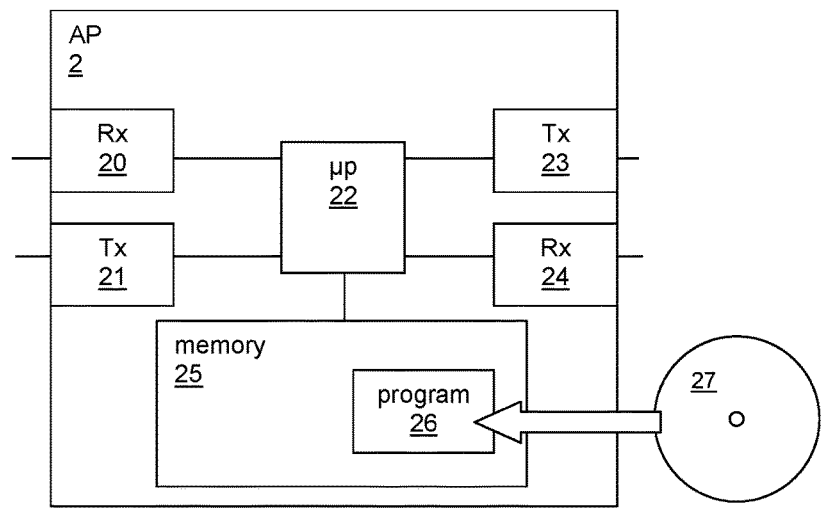
FIG. 8 illustrates schematically in a block diagram an exemplary access node.

FIG. 8 shows an access node such as the AP 2 for use in the RAN 3. The following description refers to an AP 2 but it will be appreciated that the same types of components would be required by any type of access node. The AP 2 is provided with a first receiver 20 for receiving from the UE 1 a request to attach to the RAN 3. A first transmitter 21 is provided for sending a packet to the UE 1. The first receiver 20 is being arranged to receive a response packet sent from the UE 1. A processor 22 is provided for determining, on the basis of properties of the sent packet and the response packet, a property of a radio connection between the UE 1 and the AP 2. The processor therefore determines a property based on the uplink and the downlink between the AP 2 and the UE 1. A second transmitter 23 is provided for sending an indication of the property to a selection function 12. A second receiver 24 is provided for receiving from the selection function 12 a message indicating whether to allow attachment of the UE 1 to the RAN 3.

The AP 2 is also provided with a computer readable medium in the form of a memory 25. The memory 25 may be used to store a program 26 which, when executed by the processor 22, causes the AP 2 to behave as described above. Note that the computer program 26 may be stored on an external computer readable medium in the form of a second memory 27, such as a Compact Disk or a flash drive. The computer program 26 can then be transferred to the memory 25 or executed directly by the processor 22.

Figure 9:
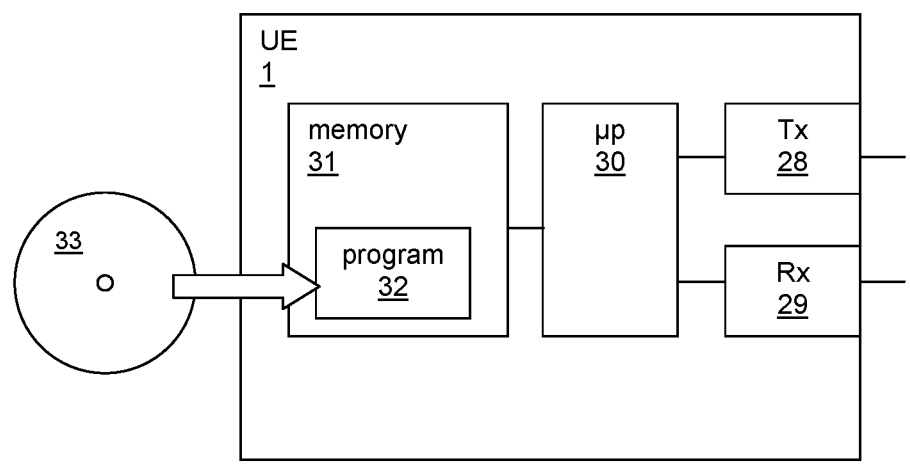
FIG. 9 illustrates schematically in a block diagram an exemplary mobile terminal.

FIG. 9 shows a mobile terminal such as a UE 1. The following description refers to a UE 1, but it will be appreciated that the same basic components are required by any type of mobile terminal. The UE 1 is provided with a transmitter 28 for sending a request to attach to the RAN 3 to the AP 2. A receiver 29 is provided for receiving a packet from the AP 2. The transmitter 28 is further arranged to send a response packet to the AP 2. The received packet and the response packet are usable by a further node to determine a property of a radio connection between the UE 1 and the AP 2 on both the uplink and the downlink. The receiver 29 is further arranged to receive from the AP 2 an indication that the UE 1 may attach to the RAN 3.

The UE 1 is also provided with a processor 30 for controlling the operation of the UE 1, and a computer readable medium in the form of a memory 31. The memory 31 may be used to store a program 32 which, when executed by the processor 30, causes the UE 1 to behave as described above. Note that the computer program 32 may be stored on an external computer readable medium in the form of a second memory 33, such as a Compact Disk or a flash drive. The computer program 32 can then be transferred to the memory 31 or executed directly by the processor 30.

Figure 10:
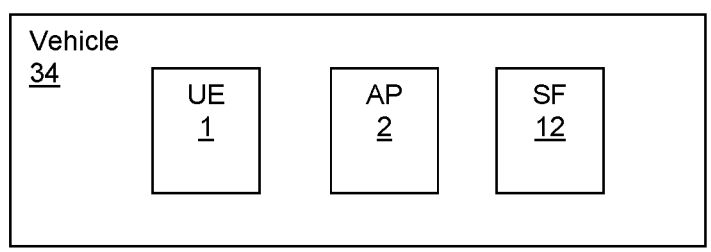
FIG. 10 illustrates schematically in a block diagram an exemplary vessel or vehicle.

FIG. 10 illustrates a vessel or a vehicle 34 such as a ship, a car, a truck, an aeroplane, a train and so on. The vessel or vehicle 34 is provided with any of a selection function 12, an access node such as an AP 2, and a mobile terminal such as a UE 1.

The skilled person will appreciate that various modifications may be made to the above described embodiments without departing from the scope of the present invention. For example, the examples given in the description concentrate on the use of a UE 1 and an AP 2 in a WLAN RAN 3. However, it will be appreciated that corresponding functions have different names with different types of network technology. The invention applies to mobile terminals other than UEs, and to RANs other than WLANs.

This IvD proposes a method to achieve accurate WLAN measurements that can be used by a network policy functions to guide the UE to the best WLAN access point. The method allows an incremental development path from today's baseline.

The following abbreviations have been used in the above description:
3GPP Third Generation Project Partnership
AAA Authentication, Authorization, and Accounting
AG Access Gateway
AN Access Node
ANDSF Access Network Discovery and Selection Function
APN Access Point Name
BBA BBF Access Interworking
BBF Broadband Forum
BNG BBF Border Network Gateway (
DHCP Dynamic Host Configuration Protocol
eNB eNodeB
EPC Evolved Packet Core
FMC Fixed Mobile Convergence (
GPRS General Packet Radio Service
GTP GPRS Tunnelling Protocol
HO handover
IPsec Internet Protocol Security
LAN Local Area Network
LTE Long Term Evolution
MMTel Multimedia Telephony
PDN Packet Data Network
PGW PDN Gateway
PMIP Proxy Mobile IP
PPPoE Point-to-Point Protocol over Ethernet
RAN Radio Access Network
RSSI Received Signal Strength Indicator
RG Residential Gateway
SAE System Architecture Evolution
SGW Serving Gateway
SNR signal to noise ratio
TNAN Trusted Non-3GPP Access Network
TWAG TWAN Access Gateway
TWAN Trusted WLAN Access Network
UE User Equipment
WLAN Wireless LAN

The invention claimed is:

1. An access node for use in a Radio Access Network, the access node comprising:
   first and second transmitters;
   first and second receivers; and
   a processing circuit;
   wherein when the first receiver receives from a mobile terminal, a request to attach to the Radio Access Network, and the mobile terminal is authenticated, the processing circuit is arranged to perform a validation phase, the validation phase determining whether a radio connection between the mobile terminal and the access node is capable of carrying data, wherein the processing circuit is arranged to:
      cause the first transmitter to send a data packet to the mobile terminal;
      cause the first receiver to receive a response data packet sent from the mobile terminal;
      determine, on the basis of properties of the sent data packet and the response data packet, a property of both an uplink and a downlink radio connection between the mobile terminal and the access node;
      cause the second transmitter to send an indication of the property to a selection function node; and
      cause the second receiver to receive from the selection function node, a message indicating whether to allow attachment of the mobile terminal to the Radio Access Network;
   wherein the Radio Access Network is a Wireless Local Area Network.

2. A mobile terminal for use in a communication network, the mobile terminal comprising:
   a transmitter;
   a receiver; and
   a processing circuit;
   wherein the transmitter is arranged to send to an access node in a Wireless Local Area Network a request to attach to the Wireless Local Area Network;
   wherein the processing circuit is arranged to participate in a validation phase after the mobile terminal is authenticated, the validation phase determining whether a radio connection between the mobile terminal and the access node is capable of carrying data, wherein the processing circuit is arranged to:
      cause the receiver to receive a received data packet from the access node; and
      cause the transmitter to send a response data packet to the access node, the received data packet and the response data packet being usable by a further node to determine a property of both an uplink and a downlink radio connection between the mobile terminal and the access node;
   the receiver being further arranged to receive from the access node, an indication that the mobile terminal may attach to the Wireless Local Area Network.

3. The mobile terminal according to claim 2, wherein the mobile terminal is implemented in a vessel or vehicle.

* * * * *